United States Patent
Dhanuka et al.

(10) Patent No.: US 10,839,139 B2
(45) Date of Patent: Nov. 17, 2020

(54) GLYPH AWARE SNAPPING

(71) Applicant: Adobe Inc., San Jose, CA (US)

(72) Inventors: Praveen Kumar Dhanuka, Howrah (IN); Gaurav Jain, Noida (IN)

(73) Assignee: Adobe Inc., San Jose, CA (US)

( * ) Notice: Subject to any disclaimer, the term of this patent is extended or adjusted under 35 U.S.C. 154(b) by 46 days.

(21) Appl. No.: 15/955,415

(22) Filed: Apr. 17, 2018

(65) Prior Publication Data

US 2019/0317980 A1 Oct. 17, 2019

(51) Int. Cl.
*G06F 17/00* (2019.01)
*G06F 40/109* (2020.01)
*G06T 11/60* (2006.01)

(52) U.S. Cl.
CPC ............ *G06F 40/109* (2020.01); *G06T 11/60* (2013.01)

(58) Field of Classification Search
CPC .... G06F 17/211; G06F 40/166; G06F 40/109; G06T 11/60
USPC ........................ 715/256, 200, 255
See application file for complete search history.

(56) References Cited

U.S. PATENT DOCUMENTS

| | | | |
|---|---|---|---|
| 10,286,907 B2 | 5/2019 | Nishiguchi et al. | |
| 10,427,679 B2 | 10/2019 | Van Dan Elzen et al. | |
| 10,497,158 B2 * | 12/2019 | Jain .................. | G06F 40/109 |
| 2009/0067675 A1 | 3/2009 | Tan et al. | |
| 2012/0307059 A1 | 12/2012 | Yamakage et al. | |
| 2013/0063599 A1 | 3/2013 | Imai et al. | |
| 2015/0227800 A1 | 8/2015 | Takemae | |
| 2015/0310283 A1 | 10/2015 | Mori | |
| 2016/0063344 A1 | 3/2016 | Fan et al. | |
| 2017/0151846 A1 | 6/2017 | Wuergler et al. | |
| 2018/0001876 A1 | 1/2018 | Oikawa | |
| 2018/0374345 A1 | 12/2018 | Suzuki et al. | |
| 2019/0156128 A1 | 5/2019 | Zhang et al. | |
| 2019/0168752 A1 | 6/2019 | Suzuki | |
| 2019/0317519 A1 | 10/2019 | Chen | |
| 2019/0369626 A1 | 12/2019 | Lui et al. | |
| 2020/0062255 A1 | 2/2020 | Fernando et al. | |

(Continued)

OTHER PUBLICATIONS

Fontlab, Designing Type in FrontLab VI, published Mar. 17, 2018, Wayback machine, pp. 1-11 (pdf).*

(Continued)

*Primary Examiner* — Manglesh M Patel
(74) *Attorney, Agent, or Firm* — SBMC

(57) ABSTRACT

Glyph aware snapping is described. A content processing system receives a selection input to select a glyph from text content presented via a user interface of a content editing application. Responsive to this, the content processing system generates and presents snapping guidelines in relation to the glyph while preserving an ability of the glyph to be editable using text editing tools. These snapping guidelines correspond to an identified subset of linear segments of the glyph and enable the content processing system to snap a focus (e.g., a cursor) of a graphics editing tool from a position proximate the snapping guidelines to a position on the snapping guidelines. This enables the content processing system to generate graphical content that aligns with the snapping guidelines and can be attached to the glyph based on the alignment—without destroying the ability of the text content to be editable using text editing tools.

20 Claims, 9 Drawing Sheets

(56) References Cited

U.S. PATENT DOCUMENTS

2020/0189582 A1   6/2020  Fukushige et al.

OTHER PUBLICATIONS

"Corrected Notice of Allowability", U.S. Appl. No. 16/368,746, dated Jul. 28, 2020, 2 pages.
"Corrected Notice of Allowability", U.S. Appl. No. 16/368,746, dated Sep. 10, 2020, 2 pages.
"Notice of Allowance", U.S. Appl. No. 16/368,746, dated Jul. 23, 2020, 8 pages.
"Notice of Allowance", U.S. Appl. No. 16/368,729, dated Aug. 6, 2020, 8 pages.

* cited by examiner

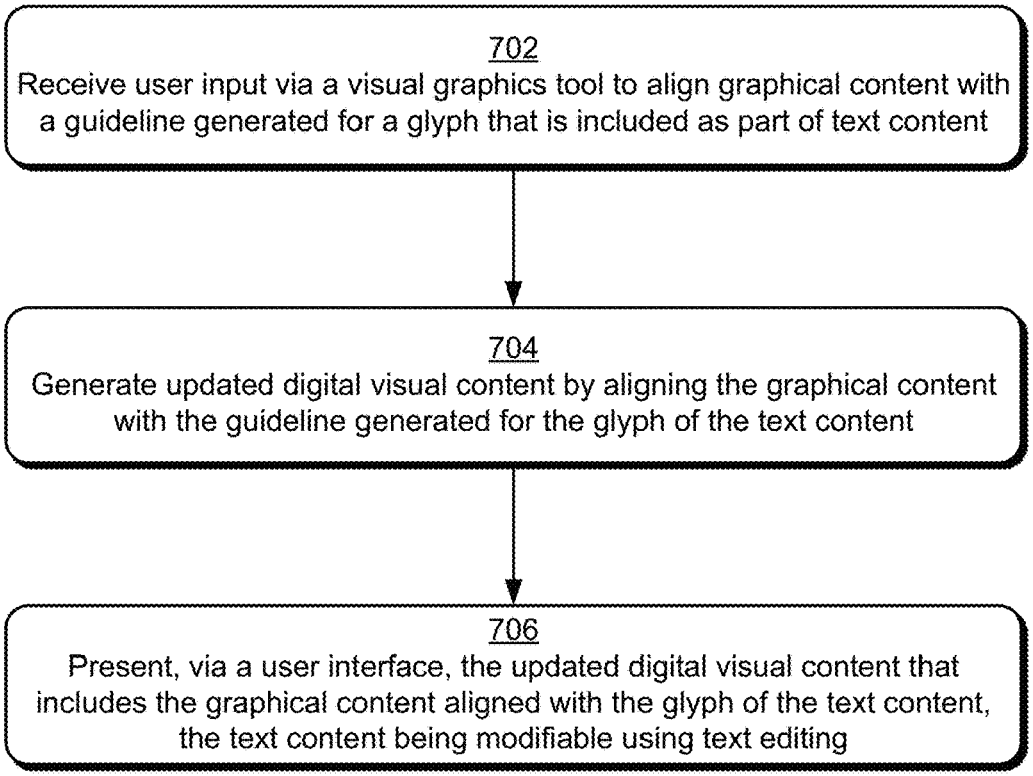

US 10,839,139 B2

GLYPH AWARE SNAPPING

BACKGROUND

Service provider systems continue to make advances in computing technologies to enable creation of digital content for various purposes. By way of example, these advances enable client device users to interact with computing systems to create digital content that conveys information, such as visual content that includes text content. A few examples of visual content that may include text are event posters, movie posters, album covers, magazine covers and pages, billboards, photographs with inspirational text, and so forth. Indeed, text can be included on a wide variety of visual content. Computing systems enable creation of digital visual content by providing user interfaces with which client device users interact to add, delete, and edit graphical (e.g., vector graphics, digital photographs, and so forth) and text content. In relation to text content, these computing systems generally provide text editing tools that enable addition of characters, deletion of characters, and functionality for editing characteristics of the text content, e.g., a font, font size, text spacing characteristics, paragraph characteristics, and so forth.

However, conventional content creation systems have limited functionality for creating graphical content, such as shapes, in relation to text content. Due to this limited functionality, conventional content creation systems force client device users to provide a multitude of inputs and interact with different tools to achieve desired combinations of graphical and text content. In addition, these inputs and tool interactions often involve the conventional systems destroying the ability of the text content to be editable using text editing tools. Thus, interactions with conventionally configured systems to achieve desired combinations of text and graphic content are not only tedious, but they also limit further editing that can be performed relative to the combined content—further text edits cannot be carried out. Consequently, client device users may avoid using conventionally configured systems to create digital content that includes text content with coordinated graphical content.

SUMMARY

To overcome these problems, glyph aware snapping is described. A content processing system receives a selection input to select a glyph, e.g., from text content presented via a user interface of a content editing application. Examples of this selection input include hovering a focus (e.g., a cursor) of a graphics editing tool proximate the glyph or selecting a menu option for generating snapping guides for the glyph. Responsive to this selection, the content processing system generates and presents snapping guidelines in relation to the glyph while preserving an ability of the glyph to be editable using a text editing tool. These snapping guidelines correspond to an identified subset of linear segments of the glyph and enable the content processing system to snap the focus of the graphics editing tool from a position proximate a snapping guideline to a position on the proximate snapping guideline. This enables the content processing system to generate graphical content that aligns with the snapping guidelines and can be attached to the glyph based on the alignment—without destroying the ability of the text content to be editable using text editing tools.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 7 depicts a procedure in an example implementation in which graphical content is generated that aligns with guidelines generated for a glyph without removing capability of the glyph to function as text.

DETAILED DESCRIPTION

Overview

Figure 1:
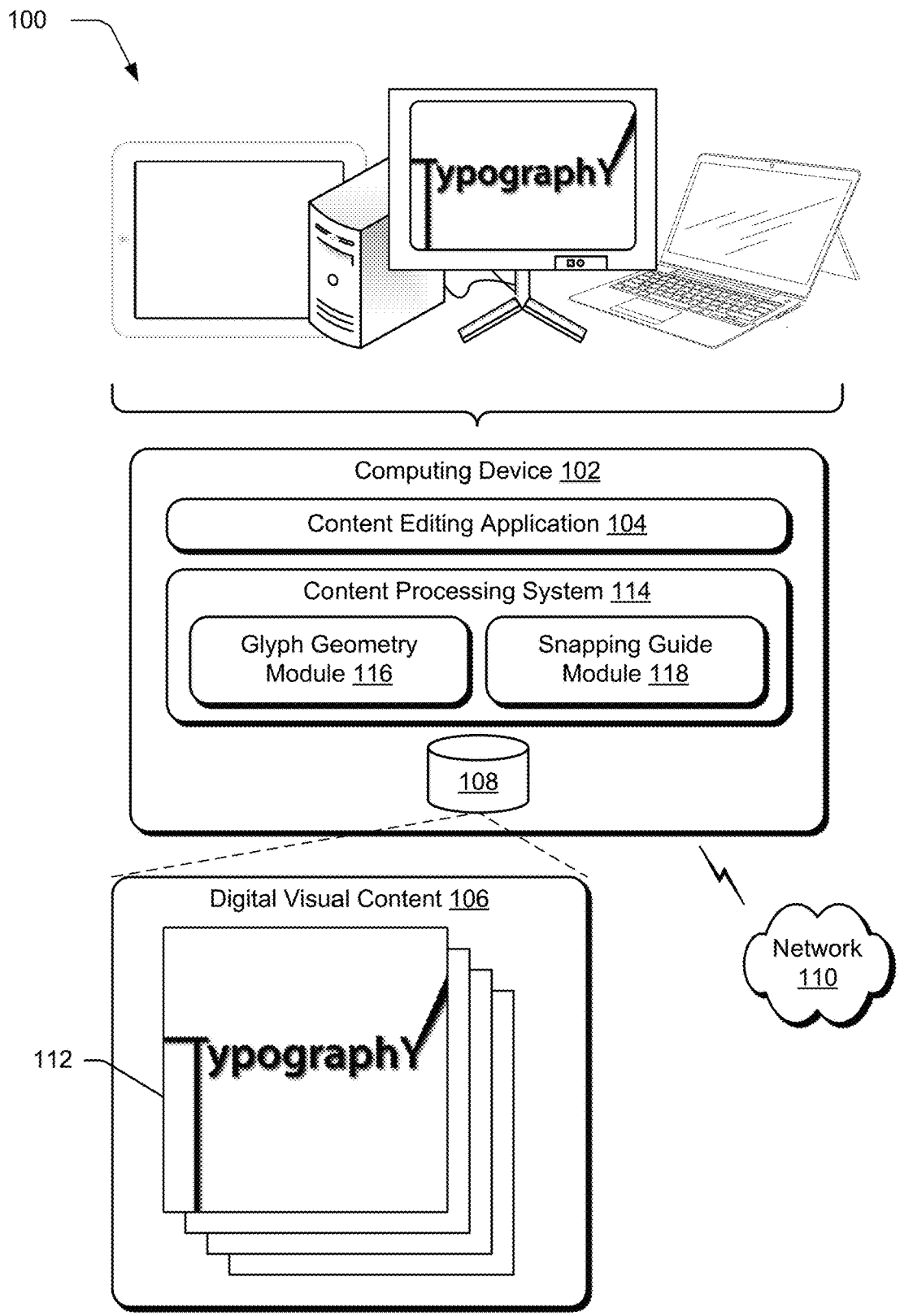
FIG. 1 is an illustration of an environment in an example implementation that is operable to employ techniques described herein.

As a result of advances in content processing technologies, computing systems are capable of including text as part of digital visual content. These computing systems enable creation of digital visual content by providing user interfaces with which client device users interact to add, delete, and edit graphical (e.g., vector graphics, digital photographs, and so forth) and text content. In relation to text content, these computing systems generally provide text editing tools that enable addition of characters, deletion of characters, and functionality for editing characteristics of the text content, e.g., a font, font size, text spacing characteristics, paragraph characteristics, and so forth. However, conventional content creation systems have limited functionality for creating graphical content, such as shapes, in relation to text content. Consequently, client device users may avoid using conventionally configured systems to create digital content that includes text content with coordinated graphical content.

To overcome these problems, glyph aware snapping is described. In accordance with the described techniques, a content processing system generates snapping guidelines for a selected glyph of text content to aid graphic design in relation to the text content. Initially, the content processing system receives a selection input to select the glyph. Examples of this selection input include hovering a focus (e.g., a cursor) of a graphics editing tool proximate the glyph or selecting a menu option for generating the snapping guidelines for the glyph. Responsive to this input, the content processing system generates and presents the snapping guidelines in relation to the selected glyph. In addition, the content processing system generates and presents the snapping guidelines while preserving an ability of the glyph to be editable using a text editing tool.

To generate the snapping guidelines, the content processing system retrieves outline information describing a shape of the glyph from font data maintained for a current font applied to the glyph. In one or more implementations, the outline information describes the shape of the glyph in terms of Bezier curves. As discussed herein, the content processing system transforms this outline information into linear-segment entries that describe an angle, intercept, and length of a respective linear segment. In some instances, the content processing system carries out this transformation, in part, by merging spans of multiple continuous linear segments into a single linear segment, e.g., when a span of the multiple continuous linear segments appears nearly straight.

The content processing system identifies a subset of the linear segments for which snapping guidelines are to be generated, e.g., "important" linear segments. The content processing system identifies this subset of linear segments based on a comparison of the information included in the entries to one or more criteria. In one or more implementations, these criteria include correspondence of a linear segment with a boundary of a glyph's bounding box. When a horizontal linear segment corresponds a bottom boundary of the glyph's bounding box, for instance, the content processing system identifies this linear segment as part of the subset. These criteria may also include that a linear segment's length meet or exceed a length threshold, such that when the content processing system determines that the segment length meets or exceeds the length threshold, the content processing system identifies the linear segment as part of the subset.

Based on the subset of identified linear segments, the content processing system generates the snapping guidelines, e.g., displayed line overlays disposed along an axis defined by a respective linear segment. The content processing system presents these snapping guidelines in relation to the selected glyph, e.g., over the glyph as presented via an editing user interface of a content editing application. The content processing system generates these snapping guidelines in substantially real-time after a selection input to select the glyph is received. To this end, a time delay that results from the content processing system performing the processing to generate the snapping guidelines may be imperceptible (or nearly imperceptible) to a client device user interacting with the content editing application.

In general, the snapping guidelines enable the content processing system to snap the focus of graphics editing tools from a position proximate the snapping guidelines to a position on a proximate snapping guideline. This enables the content processing system to generate graphical content that aligns with the snapping guidelines and thus features of individual glyphs. Additionally, this enables the content processing system to receive user input to attach the aligned graphical content to glyphs so that it aligns with the glyphs—without destroying the ability of the text content to be editable using text editing tools. Based on user input in relation to the snapping guidelines, for example, the content processing system may generate graphical content (e.g., a rectangular-shaped vector graphic) that aligns to a stem of a glyph "T," which is part of text content. In contrast to conventional techniques, however, the content processing system generates the snapping guidelines to align this graphical content with the text content and also, optionally, to attach the graphical content in alignment with the text content to generate updated text content, which is further modifiable using text editing tools.

By generating snapping guidelines for a glyph while preserving an ability to function as text content (e.g., be editable with text editing tools), the content processing system not only aids graphic design that involves creating graphics which align with text content but also reduces how tedious editing the text content is (in relation to conventional systems) after generating the snapping guidelines. In contrast to conventional systems which destroy an ability of text content to function as text when aligning graphic content, the described system preserves an ability of the text content to function as text, such that text edits can be made to the text content using keyboard strokes in relation to a caret, by selecting options to simply change a font or font size of the text (even if graphical content is attached), and so on. This can lead to creation of more visually pleasing digital visual content that includes text content with coordinated graphical content.

Term Descriptions

As used herein, the term "glyph" refers an elemental symbol within an agreed set of symbols intended to represent a readable character for the purposes of writing. Each glyph has a shape which can be described by multiple different segments (e.g., curved and linear) that, combined, form the shape. These multiple different segments can be described using Bezier curves.

As used herein, an "important" linear segment refers to a linear segment that meets one or more predefined criteria, such that important linear segments meet at least one of the criteria and linear segments that are not important do not meet at least one of the criteria.

As used herein, the term "angle" refers to a characteristic of a Bezier or linear segment that is defined with a positive direction of the x-axis, such that the angle is determined according to a slope of the segment in relation to the positive direction of the x-axis.

As used herein, the term "intercept" of a Bezier or linear segment is defined as the y-intercept when the segment is not parallel to the y-axis and the x-intercept when the line segment is parallel to the y-axis.

The term "snap" or "snapping" refers to automatically repositioning a focus (e.g., a cursor) from a first position within a user interface to a second position within the user interface. By way of example, when the focus is moved to a first position that is a predefined threshold from a snapping guideline, the described system automatically repositions ("snaps") the focus to a second position on the snapping guideline. This snapping is effective to snap a focus associated with a variety of tools to a snapping guideline. By way of example, such tools include shape drawing tools, content selection tools, line drawing tools, curve drawing tools, and so forth.

The term "angular linear segment" refers to a linear segment having an angle that is neither horizontal nor vertical in relation to the x-axis.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 9.

The computing device 102 is illustrated as including content editing application 104. The content editing application 104 represents functionality of the computing device 102 to create and/or edit digital content. By way of example, the content editing application 104 includes functionality to edit digital visual content, such as graphics that include textual content. Examples of digital graphics with textual content include, but are not limited to, album covers, posters, magazine covers, advertisements, branded-content with photographic background, digital photographs enhanced with text, and so forth.

Further, the content editing application 104 may enable a client device user to interact with application interfaces presented via the computing device 102 to perform content editing operations, such as selecting portions of digital content, adding a text-content component to digital content, removing a text-content component from digital content, editing the text, editing characteristics of the text (e.g., size, font, font weight, kerning, paragraph style, alignment, hyphenation, and so on), adding digital graphics (e.g., vector graphics), removing digital graphics, changing digital graphics, performing various digital image editing operations (e.g., cropping, zooming, scaling, applying filters, and so on), and so forth. The content editing application 104 may facilitate other content editing operations without departing from the spirit or scope of the techniques described herein. The content editing application 104 may further be representative of more than one application that supports functionality to perform content editing operations without departing from the spirit or scope of the techniques described herein.

The digital content, relative to which the content editing application 104 is configured to perform operations, is represented by digital visual content 106, which is illustrated as maintained in storage 108 of the computing device 102. Although the digital visual content 106 is illustrated as being maintained in the storage 108, the digital visual content 106 may also represent digital content accessible to the computing device 102 in other ways, e.g., accessible to the computing device 102 from storage of another device over network 110. In such implementations, the computing device 102 may represent functionality to perform the glyph snapping described above and below for other devices, e.g., to offload some of the computing burden of doing so from those devices. In other words, the computing device 102 may be configured to provide snapping guide generation as a service—and thus be considered associated with a service provider.

The digital visual content 106 may represent various types of digital content without departing from the spirit or scope of the techniques described herein. The digital visual content 106 is depicted with text graphic 112, for instance, which represents a digital visual content item having at least some text content. In the illustrated example, the text graphic 112 includes the text content "TypographY," which includes ten separate glyphs. In addition, the text graphic 112 includes graphical additions to the text content, which are attached to form updated text content. In particular, these graphical additions include an extension (downward) of a vertical stem of the first glyph "T," a second extension (leftward) of an arm of the first glyph "T," and a third extension (up- and right-ward) of a right diagonal stroke of the last glyph "Y." Indeed, a variety of graphical additions may be aligned and optionally attached to text content without departing from the spirit or scope of the described techniques.

Regardless of a type of graphical addition, though, the described techniques enable these additions to be more easily aligned to text content than conventional techniques and also are effective to do so without removing a capability of glyphs to function as text. In other words, the described techniques do not involve conversion of glyphs to outlines or shapes in such a way that the glyphs can no longer be edited as text, e.g., font changed, kerning changed, font size changed, editing which letters are included and deleted based on a location of a text cursor (e.g., a caret) and typing with keys of a keyboard, and so forth. In this context, consider content processing system 114, which is depicted having glyph geometry module 116 and snapping guide module 118.

In the illustrated environment 100, the computing device 102 is depicted including the content processing system 114, the functionality of which may be incorporated in and/or accessible to the content editing application 104. The content processing system 114 is implemented at least partially in hardware of the computing device 102 to generate snapping guides for a selected glyph of the text graphic 112's text content without removing the capability of the selected glyph to function as text. Examples of snapping guides include snapping points (e.g., at corners of a glyph stroke) and snapping guidelines (e.g., that extend along an axis defined by one or more segments forming a glyph's outline), as described in relation to FIGS. 3-6B. To generate snapping guides, the content processing system 114 employs the glyph geometry module 116 and the snapping guide module 118. Although illustrated as implemented locally at the computing device 102, functionality of the illustrated content processing system 114 may also be implemented in whole or part via functionality available via the network 110, such as part of a web service or "in the cloud."

The glyph geometry module 116 and the snapping guide module 118 are implemented at least partially in hardware of the computing device 102 (e.g., through use of a processing system and computer-readable storage media) to determine a geometry of a glyph selected from the text content of the text graphic 112 and, based on the determined geometry, generate snapping guides (e.g., points and/or lines), which enable users to provide input for easily aligning graphical additions with text content—while maintaining properties of the glyph as editable text.

In one or more implementations, the glyph geometry module 116 generates an outline of a selected glyph, e.g., a shape corresponding to the selected glyph. The glyph geometry module 116 generates this outline using background processing, such that the generated outline is not displayed via a display device communicably coupled to the computing device 102. Instead, the computing device 102 continues to present the selected glyph as text. From the generated outline, the glyph geometry module 116 determines geometric characteristics of the glyph, such as axes that substantially correspond to boundaries of the glyph's strokes, even spacing across the glyph (e.g., a horizontal center of the entire glyph, a vertical middle of the entire glyph), even spacing across one or more particular strokes of the glyph, and so forth.

The snapping guide module 118 generates snapping guides for presentation via a user interface (e.g., of the content editing application 104) based on the determined geometry. For instance, the snapping guide module 118 determines which geometric characteristics of the glyph are "important enough" to support generation of a corresponding snapping guideline. Consider a serif font, such as "Times New Roman," for example. Many of the glyphs in serif fonts include strokes where the terminals (the ends of the strokes) end in a serif—a semi-structural detail or small decorative flourish. In this example, the snapping guide module 118 may generate vertical snapping guidelines that substantially bound the leftmost stem of a serif version of the letter "M," but not generate snapping guidelines for the flourishes at the top and bottom of that stem. The snapping guide module 118 determines which geometric characteristics to generate snapping guides for based, in part, on one or more criteria. These criteria can include a relative size of the geometric characteristics in relation to other geometric characteristics and/or in relation to a size of the glyph. These criteria can also include correspondence with a bounding box of the glyph. The snapping guide module 118 can select the geometric features for which snapping guides are generated in various ways as described in more detail below.

By providing these snapping guides for a selected glyph, the content processing system 114 aids client device users interacting with content editing applications in adding graphic elements to digital visual content that includes text content. Notably, the techniques deployed by the content processing system 114 enable these users to avoid manually converting text content to outlines of glyph shapes, providing input to position guidelines around these outlines or insert guide points, add graphical elements in relation to manually positioned guidelines and guide points, and also avoids destroying the capability of the glyphs to function as editable text. Accordingly, client device users may leverage this functionality to perform text-based graphics operations more often than they are performed in connection with conventional techniques. Moreover, this can lead to creation of more visually pleasing digital visual content that includes text components. Operation of the glyph geometry module 116 and the snapping guide module 118 is described in greater detail in relation to FIG. 2 in the following description.

Glyph Aware Snapping

Figure 2:
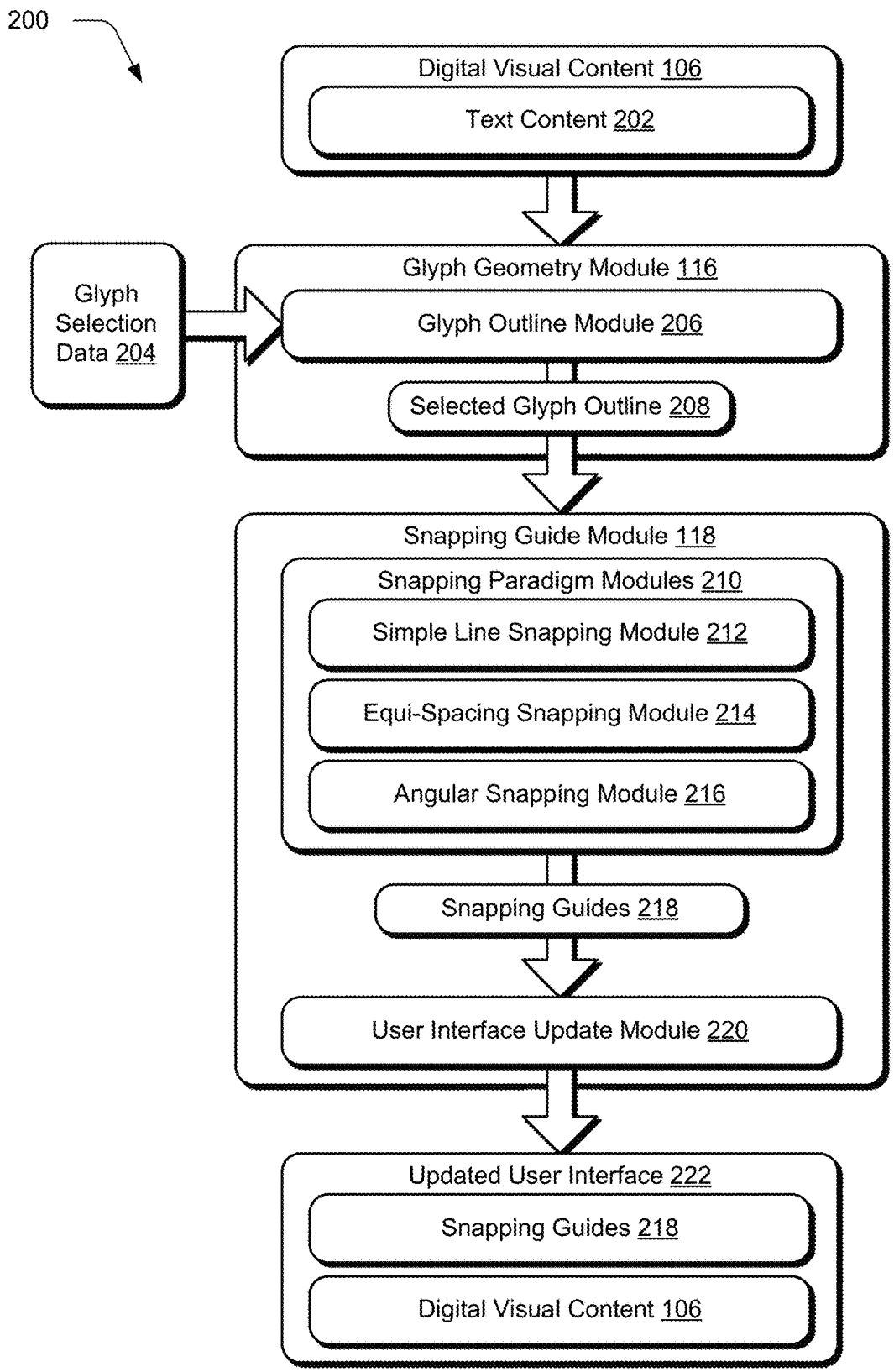
FIG. 2 depicts an example implementation in which a content processing system of FIG. 1 generates snapping guides for a selected glyph without removing capability of the glyph to function as text.

FIG. 2 depicts a system 200 in an example implementation in which operation of the glyph geometry module 116 and the snapping guide module 118 is described in more detail as generating snapping guides for a selected glyph without removing a capability of the glyph to function as editable text.

The glyph geometry module 116 and the snapping guide module 118 in this example are incorporated as part of a system to generate data effective to present snapping guidelines in relation to selected glyphs of text content 202. In the illustrated example 200, the text content 202 is depicted as part of the digital visual content 106. The text content 202 may correspond to the text content (e.g., "TypographY") of the text graphic 112 in accordance with the described techniques. To begin, the glyph geometry module 116 obtains or otherwise has access to the digital visual content 106 with the text content 202. The glyph geometry module 116 also obtains glyph selection data 204. The glyph selection data 204 describes a particular glyph of the text content 202 that has been selected for generating snapping guides. As examples of user inputs that are effective to select a glyph for initiation of snapping guide generation, consider FIGS. 3 and 4.

Figure 3:
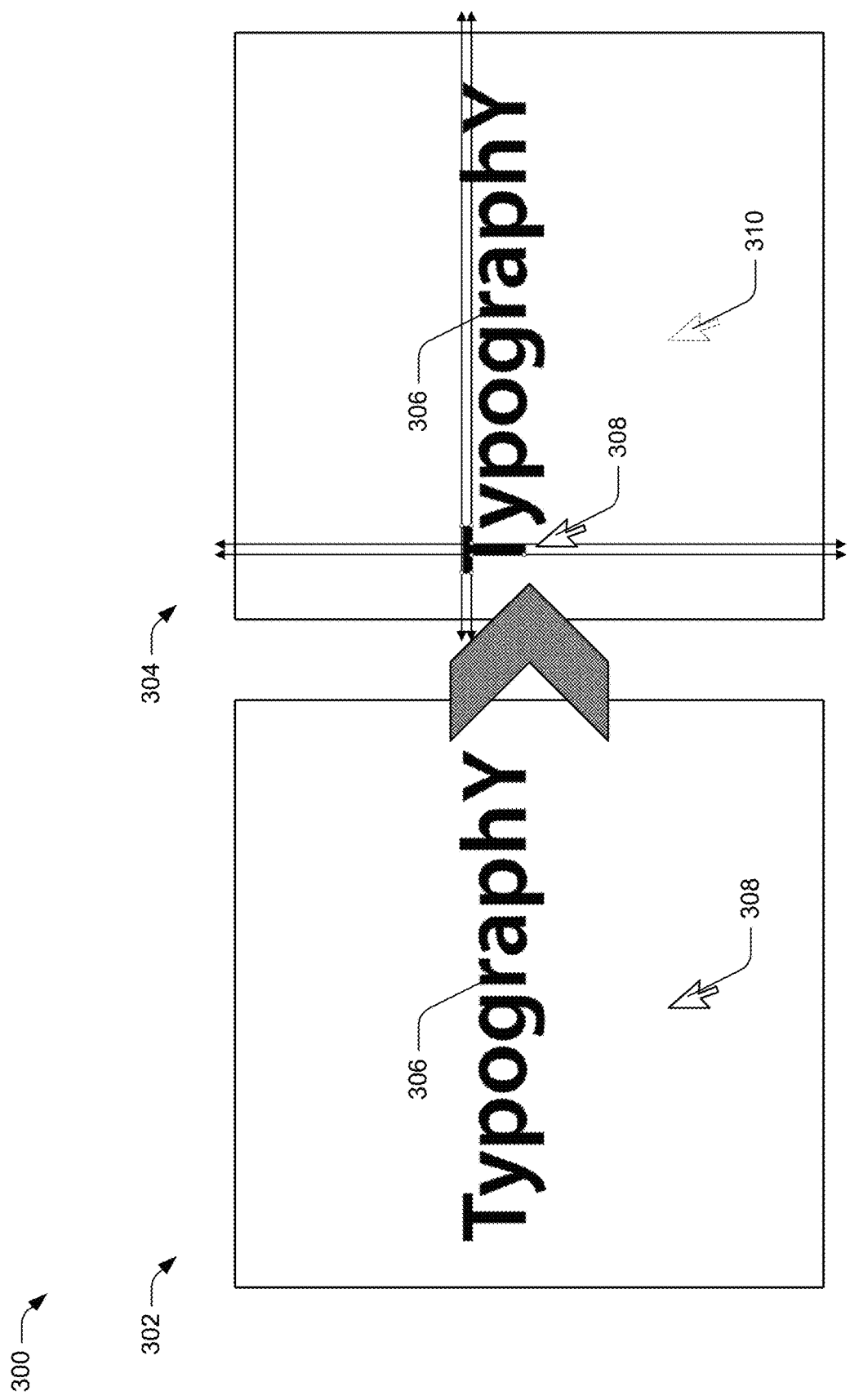
FIG. 3 depicts an example selection of a glyph to initiate generation of snapping guides for the glyph.

FIG. 3 depicts an example selection 300 of a glyph to initiate generation of snapping guides for the glyph. The illustrated example 300 includes first user interface configuration 302 and second user interface configuration 304. Both the first and second user interface configurations 302, 304 include text content 306, which corresponds to the text content 202 of FIG. 2. The first and second user interface configurations 302, 304 are also depicted with cursor 308.

The illustrated example 300 conveys one example scenario of selecting a glyph of the text content 306. In particular, the illustrated example 300 conveys a scenario where a first glyph (e.g., "T") of the text content 306 is selected. In contrast to the first user interface configuration 302, the second user interface configuration 304 includes the cursor 308 proximate the first glyph. Cursor ghost 310, depicted in the second user interface configuration 304, is indicative of a position where the cursor 308 was located at a previous time—a time corresponding to the first user interface configuration 302. It is to be appreciated that the cursor ghost 310 is not displayed as part of the corresponding user interface—the cursor ghost 310 is merely included in the illustration to indicate movement from a first position at a first time to a second position at a second time that corresponds to the second user interface configuration 304, e.g., proximate the first glyph.

In one or more implementations, a position of the cursor 308 proximate the first glyph (e.g., within a threshold distance or bounding box of the first glyph) may be effective to select the first glyph for snapping guide generation. Alternately or in addition, the first glyph may selected based on hovering the cursor 308 proximate the first glyph (e.g., within the threshold distance or bounding box) for at least a threshold amount of time. In one or more implementations, a cursor may not be presented. Instead, user input to select a glyph may be received via touch and/or stylus input, such that a finger or stylus hovers proximate a glyph for the selected amount of time. In any case, such input received in relation to the first glyph indicates to generate snapping guides for the glyph. In the context of FIG. 2, these user inputs to select the first glyph correspond to the glyph selection data 204, which describes the particular glyph selected from the text content 202 for snapping guide generation.

Figure 4:
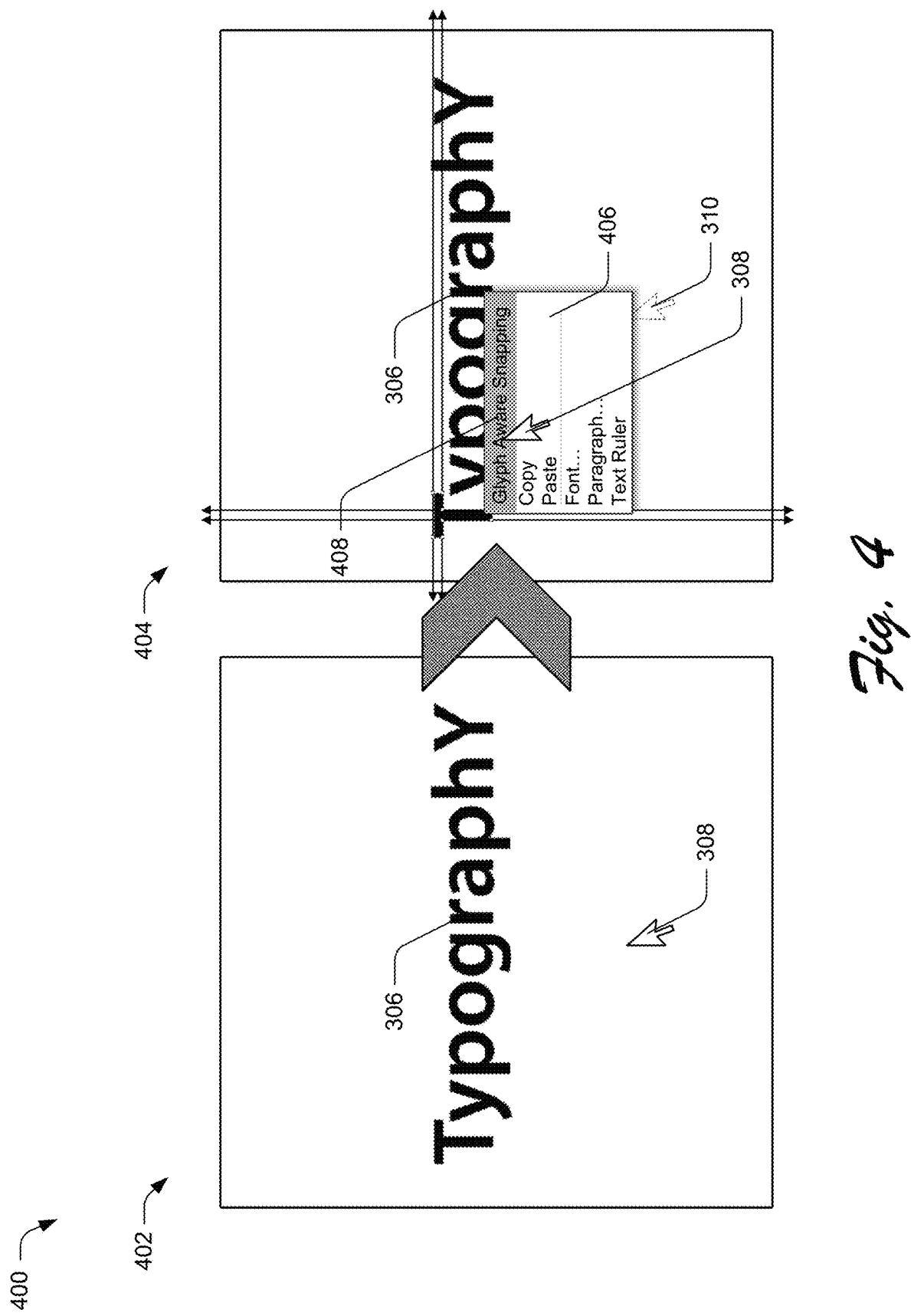
FIG. 4 depicts another example selection of a glyph to initiate generation of snapping guides for the glyph.

FIG. 4 depicts another example selection 400 of a glyph to initiate generation of snapping guides for the glyph. The illustrated example 400 includes first user interface configuration 402 and second user interface configuration 404. Both the first and second user interface configurations 402, 404 include the text content 306 and are depicted with the cursor 308.

The illustrated example 400 depicts an example glyph selection scenario that is different from the illustrated example 300. Like the illustrated example 300, the illustrated example 400 conveys a scenario where the first glyph (e.g., "T") of the text content 306 is selected. Rather than selecting the first glyph based on hovering or a proximate location of the cursor 308, however, the illustrated example 400 represents a scenario in which user input for a menu selection is received to initiate generation of snapping guides. In contrast to the first user interface configuration 402, the second user interface configuration 404 includes the cursor 308 proximate menu 406. The cursor ghost 310 is indicative of a position where the cursor 308 was located at a previous time—a time corresponding to the first user interface configuration 402. Again, it is to be appreciated that the cursor ghost 310 is merely included to indicate movement from a first position at a first time to a second position at a second time. Here, the second time corresponds to the second user interface configuration 304, e.g., where the cursor 308 is positioned over the menu 406.

In one or more implementations, the content processing system 114 presents the menu 406 responsive to a user selection (e.g., right click, tap, press into a display screen, and so forth) proximate the first glyph (e.g., within a threshold distance or bounding box of the first glyph). The user may then select option 408 ("Glyph Aware Snapping") of the menu 406. Responsive to selection of the option 408, snapping guides are generated for the glyph. User input may be received in relation to a menu to initiate snapping guide generation for a glyph in a variety of ways without departing from the described techniques. In the context of FIG. 2, selection of the option 408 to initiate snapping guide generation corresponds to the glyph selection data 204, which describes the particular glyph selected from the text content 202.

Returning now to the discussion of the glyph geometry module 116 as depicted in FIG. 2, in accordance with one or more implementations. Based on receipt of the glyph selection data 204 and the text content 202, the glyph geometry module 116 leverages functionality of glyph outline module 206. The glyph outline module 206 represents functionality to generate selected glyph outline 208 for the glyph indicated by the glyph selection data 204. As mentioned above, the glyph outline module 206 generates the selected glyph outline 208 in the background, such that the selected glyph outline 208 is not displayed and so that the selected glyph maintains its properties as text.

To generate the selected glyph outline 208, the glyph outline module 206 obtains outline information about the selected glyph from a font file corresponding to a current font applied to the text content 202. Further, the glyph outline module 206 determines "linear segments" from the obtained outline information. The glyph outline module 206 also represents functionality to instantiate a data structure (e.g., a line list table) for the selected glyph and populate the data structure with glyph information describing the determined linear segments. To this end, the selected glyph outline 208 may represent a line list table produced by the glyph outline module 206 to describe at least some of the determined linear segments forming the selected glyph.

Broadly speaking, the glyph outline module 206 determines these linear segments by transforming the outline information obtained from the noted font file. In one or more implementations, the outline information describes one or more Bezier segments (e.g., cubic or quadratic)—Bezier segments can be used to represent both lines and curves—that combine to form a glyph's outline in the corresponding font. As part of determining the linear segments, the glyph outline module 206 may merge segments described by the outline information, e.g., the Bezier segments.

In some scenarios, multiple continuous linear segments described by the outline information may form a nearly straight looking line. In general, this means that a slope variation of each segment of these continuous linear segments does not exceed a pre-defined threshold value. Rather than treat a span of such continuous segments as different linear segments, the glyph outline module 206 instead treats the span as a singular linear segment. To do so, the glyph outline module 206 determines a starting point of the span (e.g., a first point of a first segment of the continuous segment span), traverses the span of segments, and determines an ending point of the span (e.g., a last point of a last segment of the continuous segment span). The glyph outline module 206 then determines a slope between the starting point and the ending point. The glyph outline module 206 computes the singular linear segment for a span of continuous, nearly linear segments based on the starting point, the ending point, and the determined slope.

Based on determined linear segments, the glyph outline module 206 builds a line list table for the selected glyph. In one or more implementations, the line list table is a map of a list of parallel linear segments. By way of example, the glyph outline module 206 builds the line list table such that a row of the table includes information about linear segments having a same angle, e.g., the linear segments in the row are parallel. In other words, a first row includes a list of linear segments having a first angle, the second row includes a list of linear segments having a second angle, and so forth. Given this, a "key" of a line list table is an angle and a "value" of the line list table is a list of line segments with a same angle but with different intercepts. The information stored in the line list table for each list node (e.g., describing one linear segment) includes intercept of the linear segment, start and end points of the linear segment, and a length of the linear segment. As used herein, the "angle" of a Bezier segment is defined with a positive direction of the x-axis, such that the glyph outline module 206 determines the angle using the slope of a linear segment in relation to the positive direction of the x-axis. The "intercept" of a Bezier segment is defined as the y-intercept when the line segment is not parallel to the y-axis and the x-intercept when the line segment is parallel to the y-axis.

In one or more implementations, the selected glyph outline 208 created as the line list table is transformation agnostic. Consider an example in which the glyph outline module 206 generates this line list table for a first glyph "A" that is part of the text content 202. In this example, consider also that there is a second glyph "A" that is part of the same text content 202, e.g., it is displayed concurrently in a same user interface. Further, a same font is applied to both the first and second glyphs. In accordance with the described techniques, the selected glyph outline module 206 does not generate the line list table twice for the glyph "A"—once for the first instance and once for the second instance. Instead, the selected glyph outline module 206 generates the line list table just once (e.g., responsive to selection of the first glyph), the system then caches the information, and the cached line list table is used to generate snapping guidelines for the second glyph (e.g., responsive to selection of the second glyph). In a scenario where the second glyph is transformed from the first glyph (e.g., scaled, rotated, etc.), the glyph geometry module 116 simply applies a transformation matrix—indicative of transformations between the first glyph and the second glyph—to the line list table.

The snapping guide module 118 receives the selected glyph outline 208. The snapping guide module 118 represents functionality to process the selected glyph outline 208 to determine snapping guidelines for presentation with the selected glyph. In one or more implementations, this involves identifying a subset of "important" linear segments from the linear segments described by the selected glyph outline 208, e.g., the constructed linear list table. By way of example, the snapping guide module 118 identifies linear segments as "important" based on one or more criteria. For instance, these criteria include correspondence with a bounding box of the glyph, such that a linear segment corresponding to the bounding box is considered important.

Consider an example in which the snapping guide module 118 identifies linear segments for the letter capital "T." A bounding box for "T" may include a top boundary line that runs horizontally over a top of the arm of "T," and a bottom boundary line that runs horizontally over a bottom of the stem of "T." Additionally, the linear list table describing segments of the letter "T" may include information describing, among other segments, a first linear segment that spans the top of the arm of "T" and a second linear segment (a shorter one) that spans the bottom of the stem of "T." In accordance with the principles discussed herein, the first linear segment "corresponds" to the top boundary of the bounding box and the second linear segment "corresponds" to the bottom boundary of the bounding box. The snapping guide module 118 may thus identify the first and the second linear segments as belonging to the subset of "important" linear segments.

The criteria used to identify this subset may also include a length criteria, such that a length of a linear segment (e.g., a group of the merged Bezier segments) identified as part of the subset meets or exceeds a length threshold. By way of example, the length threshold may be defined based on a percentage of a length of a glyph's bounding box, a percentage of a total length of the glyph, or an absolute length value. Accordingly, the snapping guide module 118 represents functionality to compare a length of the linear segments described in the linear list table to a selected length threshold, and determine whether the length meets or exceeds the threshold. Responsive to determining that the length meets or exceeds the threshold, the snapping guide module 118 is configured to identify the respective linear segment as part of the subset.

In illustrated example, the snapping guide module 118 is further illustrated having snapping paradigm modules 210, which include simple line snapping module 212, equi-spacing snapping module 214, and angular snapping module 216. In general, the snapping paradigm modules 210 represent functionality to determine snapping guides 218. Although a majority of the discussion herein is related to generating the snapping guides 218 as snapping guidelines for "important" linear segments of a glyph, the snapping guide module 118 can also generate snapping points based on the important linear segments of a glyph. In any case, the snapping paradigm modules 210 determine the snapping guides 218 based on the subset of linear segments identified as important from the linear list table represented by the selected glyph outline 208.

Broadly speaking, the simple line snapping module 212 identifies horizontal and vertical linear segments from the subset, e.g., based on an angle of the linear segments and/or the intercept. Further, the simple line snapping module 212 generates the snapping guides 218 for the identified horizontal and vertical segments. The snapping guides 218 generated for the identified horizontal and vertical segments include snapping guidelines that correspond to the horizontal and vertical segments. In this context consider FIG. 5.

Figure 5:
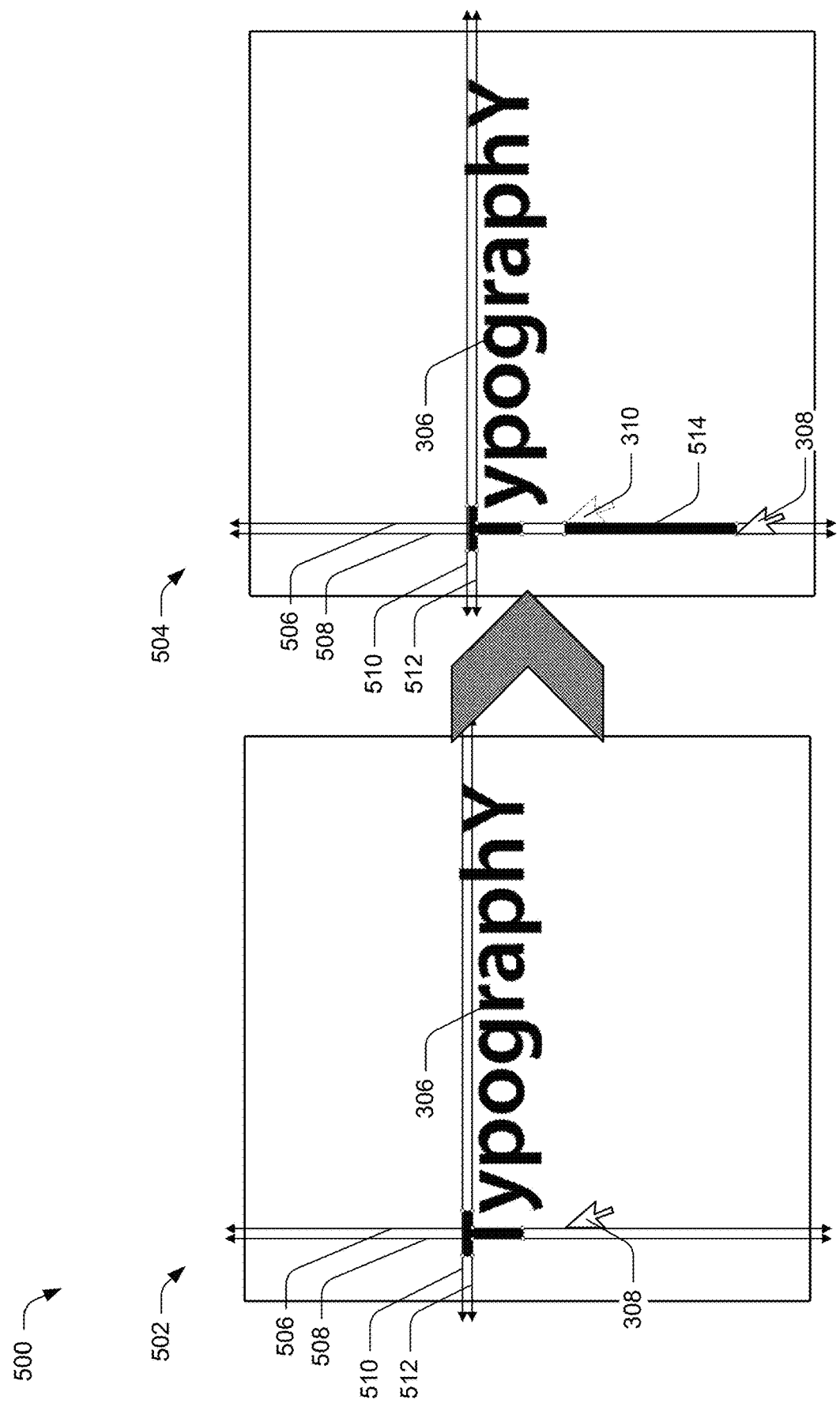
FIG. 5 depicts an example graphical update made in relation to a glyph of text content using snapping guides generated for the glyph.

FIG. 5 depicts an example 500 of a graphical update made in relation to a glyph of text content using snapping guides generated for the glyph. The illustrated example 500 depicts a user interface at a first time 502 and a second time 504. Like FIGS. 3 and 4, the illustrated example 500 includes the text content 306 and the cursor 308—shown in the user interface at both the first and second times 502, 504.

In the illustrated example 500, the depicted user interface also includes vertical guidelines 506, 508 and horizontal guidelines 510, 512, which correspond to snapping guides 218. In the context of this example, the simple line snapping module 212 generates the vertical and horizontal guidelines 506, 508, 510, 512 for identified vertical and horizontal line segments of the selected glyph—the "T" of the text content 306 in the continuing example.

In general, such snapping guides 218 enable users to easily add graphics in relation to glyphs by causing a cursor to "snap" to the snapping guides 218, e.g., when the cursor is positioned within some threshold of the snapping guides 218. In the context of FIG. 5, for instance, when the cursor 308 is within a threshold proximity of the vertical guideline 506, the described system causes the cursor 308 to snap to the vertical guideline 506. By "snap" it is meant that the system repositions the cursor 308 on the proximate snapping guide 218. In the illustrated example 500, the cursor 308 is depicted having been snapped at the first time 502 to the vertical guideline 506. Indeed, the system may snap the cursor 308 to the other depicted snapping guides when it is proximate those other snapping guides. At the second time 504, for instance, the cursor 308 is depicted having been snapped to the vertical guideline 508. The described system may snap the cursor 308 to the vertical guideline 508 based on user input to move the cursor 308 from an initial position—as indicated by the cursor ghost 310—to a different position as depicted at the second time 504.

The second time 504 further includes graphical addition 514, which is a new shape bounded by "important" lines generated for the selected glyph "T," e.g., the vertical guidelines 506, 508. By way of example, the graphical addition 514 may be generated according to user input (e.g., to draw a rectangle with a rectangle tool) that is supported by snapping the cursor 308 to the vertical guidelines 506, 508. Additional user input may be received subsequently to attach the graphical addition 514 to the glyph "T," e.g., by selecting the graphical addition 514 with the cursor 308 and dragging the graphical addition 514 to stem of the glyph "T."

In addition to the functionality of the simple line snapping module 212, the snapping guide module 118 also leverages functionality of the equi-spacing snapping module 214 and the angular snapping module 216 to generate the snapping guides 218. In general, the equi-spacing snapping module 214 represents functionality to calculate "centered" horizontal and vertical guidelines, each of which are centered in relation to an identified pair of horizontal or vertical linear segments from the subset. In contrast, the angular snapping module 216 identifies non-vertical and non-horizontal linear segments ("angular linear segments") from the subset, e.g., based on an angle of the linear segments. Further, the angular snapping module 216 generates the snapping guides 218 for the identified angular linear segments. The functionality of the equi-spacing snapping module 214 and the angular snapping module 216 is further discussed in relation to FIGS. 6A and 6B, respectively.

Figure 6A:
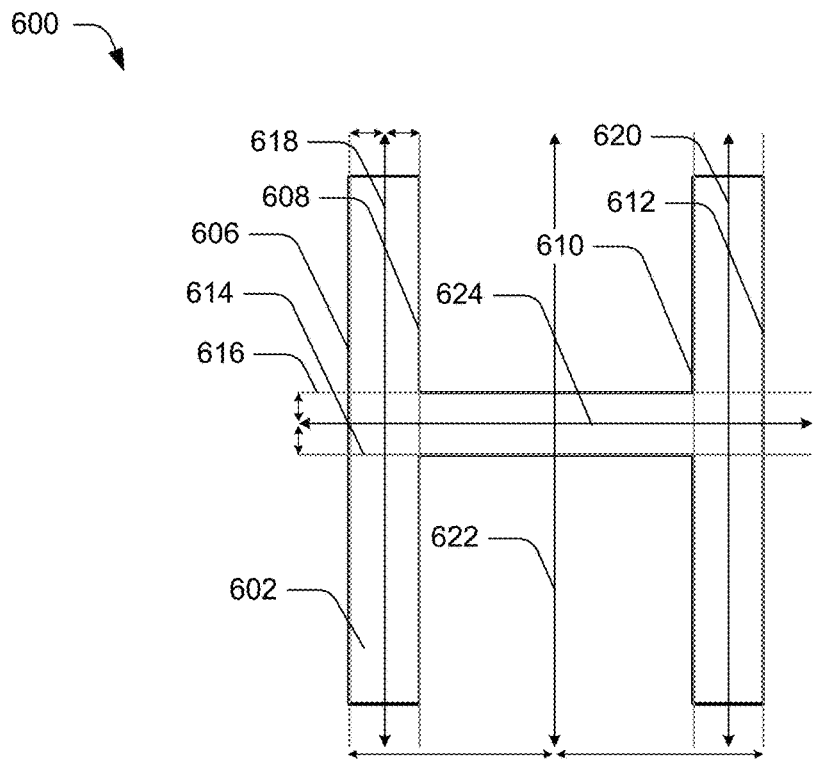
FIG. 6A depicts an example implementation in which horizontal and vertical snapping guides are determined based on substantially equal spacing between pairs of linear segments of a glyph's outline.
Figure 6B:
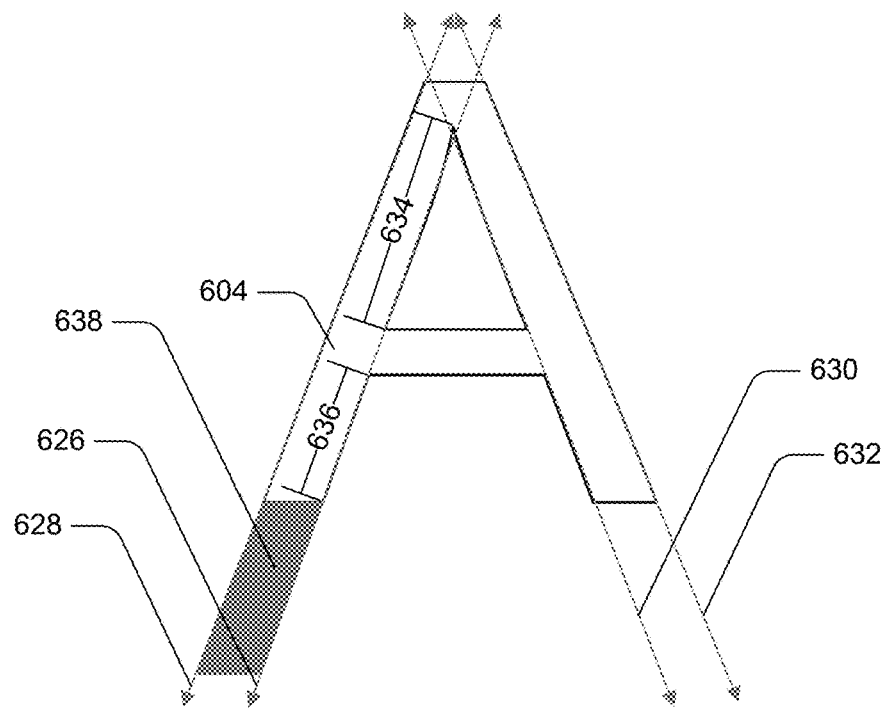
FIG. 6B depicts an example implementation in which angular snapping guides are determined based on non-vertical and non-horizontal angled linear segments of a glyph's outline.

FIG. 6A depicts at 600 an example implementation in which horizontal and vertical snapping guides are determined based on substantially equal spacing between pairs of linear segments of a glyph's outline. FIG. 6B further depicts at 600 an example implementation in which angular snapping guidelines are determined based on non-vertical and non-horizontal angled linear segments of a glyph's outline.

The illustrated example 600 includes a first glyph 602 and a second glyph 604. In this example, the first glyph 602 corresponds to the letter "H" and the second glyph 604 corresponds to the letter "A." These particular letters are included in FIGS. 6A and 6B because they convey the equal spacing and angular snapping guide concepts.

In relation to the first glyph 602, the illustrated example 600 includes vertical axes 606, 608, 610, 612, which correspond to vertical linear segments of the first glyph 602. The illustrated example 600 also includes horizontal axes 614, 616 depicted in relation to the first glyph 602. The horizontal axes 614, 616 correspond to horizontal linear segments of the first glyph 602. In accordance with the described techniques, the equi-spacing snapping module 214 determines vertical snapping guidelines that are centered between pairs of vertical linear segments corresponding to the vertical axes 606, 608, 610, 612.

By way of example, the equi-spacing snapping module 214 determines a first vertical guideline 618 for snapping as substantially equidistant between the linear segments corresponding to the vertical axes 606, 608. Similarly, the equi-spacing snapping module 214 determines a second vertical guideline 618 for snapping as substantially equidistant between the linear segments corresponding to the vertical axes 610, 612. Further, the equi-spacing snapping module 214 determines a third vertical guideline 622 for snapping as substantially equidistant between the linear segments corresponding to the vertical axes 606, 612. The first, second, and third vertical guidelines 618, 620, 622, each correspond to one of the snapping guides 218 generated for the first glyph 602. In the context of the first glyph 602, the equi-spacing snapping module 214 also determines a first horizontal guideline 624 for snapping as substantially equidistant between the linear segments corresponding to the horizontal axes 614, 616. The first horizontal guideline 624 also corresponds to one of the snapping guides 218 generated for the first glyph 602. It is to be appreciated that snapping guidelines are also generated for the vertical axes 606, 608, 610, 612 and the horizontal axes 614, 616, e.g., by the simple line snapping module 212.

In relation to the second glyph 604, the illustrated example 600 includes angular guidelines 626, 628, 630, 632, which each correspond to one of the snapping guides 218 generated for the second glyph 604 by the angular snapping module 216. To generate angular snapping guides, the angular snapping guide module 216 reads angle values from the generated line list table for linear segments of the selected glyph. The angular snapping module 216 generates an angular snapping guideline for a linear segment based, in part, on the determined angle. In scenarios where two or more of these linear segments are disposed substantially along a same axis—as may be the case with the linear segments 634, 636 determined for the leftmost stoke of the second glyph 604—the segments may have different angles, e.g., 71 degrees and 72 degrees. Rather than generating different angular guidelines for each linear segment, the angular snapping module 216 instead selects one of the determined angles and generates a single angular guideline at the selected angle. For instance, the angular guidelines 626, 630 may be generated at angles each selected from a set of angles for the linear segments disposed substantially along a same axis. By substantially along a same axis, it is meant that a difference between the angles is less than a tolerance threshold.

Due to the angular guidelines 626, 628, a client device user is able to easily provide input to create graphical addition 638 (a polygon) for the second glyph 604. By way of example, the described system may initially snap a cursor, or other focus of a graphics creation tool (e.g., a shape drawing too), to the angular guideline 626. User input may then be received to drag the cursor or focus away from the initial position and toward the angular guideline 628. Once within a threshold position of the angular guideline 628, the system may cause the cursor or focus to snap to the angular guideline 628. In this way, the described system aids users to easily create angular shapes, such as the graphical addition 638.

In one or more implementations, the functionality of the angular snapping module 216 is usable to generate snapping guidelines for content other than glyphs of text content, such as for vector-graphic shapes. By way of example, a drawing application can leverage functionality of the angular snapping module 216 to generate non-horizontal and non-vertical snapping guidelines for a variety of graphic content, such as for parallelograms, trapezoids, triangles, chevrons, stars, and so forth. Having discussed the functionality of the snapping paradigm modules 210, consider again the snapping guide module 118, as illustrated in FIG. 2.

In the illustrated example 200, the snapping guide module 118 further includes user interface update module 220. The user interface update module 220 represents functionality to update a user interface—via which the digital visual content 106 with the text content 202 is displayed—to include the snapping guides 218. In other words, the user interface update module 220 causes the user interface to present the snapping guides 218. In accordance with this, updated user interface 222 represents a user interface (e.g., of the content editing application 104) that is updated to include snapping guides 218, which may be presented over portions of the digital visual content 106, e.g., over a selected glyph of the text content 202. The user interface update module 220 may display the snapping guides 218 in other ways to visually emphasize them in relation to digital visual content being created, such as by displaying the snapping guides in a particular (e.g., contrasting) color, with labels, and so forth. The updated user interface 222 may be generated and displayed substantially in real-time after receipt of the glyph selection data 204, such that the processing performed by the glyph geometry module 116 and the snapping guide module 118 may not be perceptible (or may be minimally perceptible) to a client device user.

Having discussed example details of the techniques for glyph aware snapping, consider now some example procedures to illustrate additional aspects of the techniques.

Example Procedures

This section describes example procedures for glyph aware snapping in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations, the procedures are performed by a suitably configured device, such as the computing device 102 of FIG. 1 having a content processing system 114 that makes use a glyph geometry module 116 and a snapping guide module 118 or one implemented as the example system 200 of FIG. 2, which also make use of those modules.

FIG. 7 depicts an example procedure 700 in which graphical content is generated that aligns with guidelines generated for a glyph without removing capability of the glyph to function as text. User input is received via a visual graphics tool to align graphical content with one or more guidelines generated for a glyph included as part of text content (block 702). By way of example, the content processing system 114 receives user input via a tool of the content editing application 104 (e.g., a rectangle drawing tool) to create the graphical addition 514 (e.g., a rectangle) so that it aligns with at least one guideline generated for the glyph "T," which is included as part of the text content 306.

Updated digital visual content is generated by aligning the graphical content to the at least one guideline generated for the glyph that is included as part of the text content (block 704). By way of example, the content processing system 114 generates the graphical addition 514 to align with at least one guideline of the "T" that is included as part of the text content 306. In particular, the content processing system 114 constrains the graphical addition 514 so that the graphical addition 514 is bounded by the vertical guidelines 506, 508.

The updated digital visual content is presented via a user interface (block 706). In accordance with the principles discussed herein, the text content that is included as part of the updated digital visual content is presented having the attached graphical content aligned to the glyph and is also modifiable using text editing. By way of example, the text content 306 is presented via the user interface as depicted at the second time 504. In particular, the text content 306 at the second time 504 includes the glyph "T" and the graphical addition 514 aligned to the glyph. Moreover, the text content 306 remains modifiable using text editing functionality, e.g., font can be changed, font size (in contrast to shape size) can be changed (in points), characters (presented as the separate glyphs) can be added and deleted by typing relative to a text cursor (e.g., caret) position, and so forth.

Figure 8:
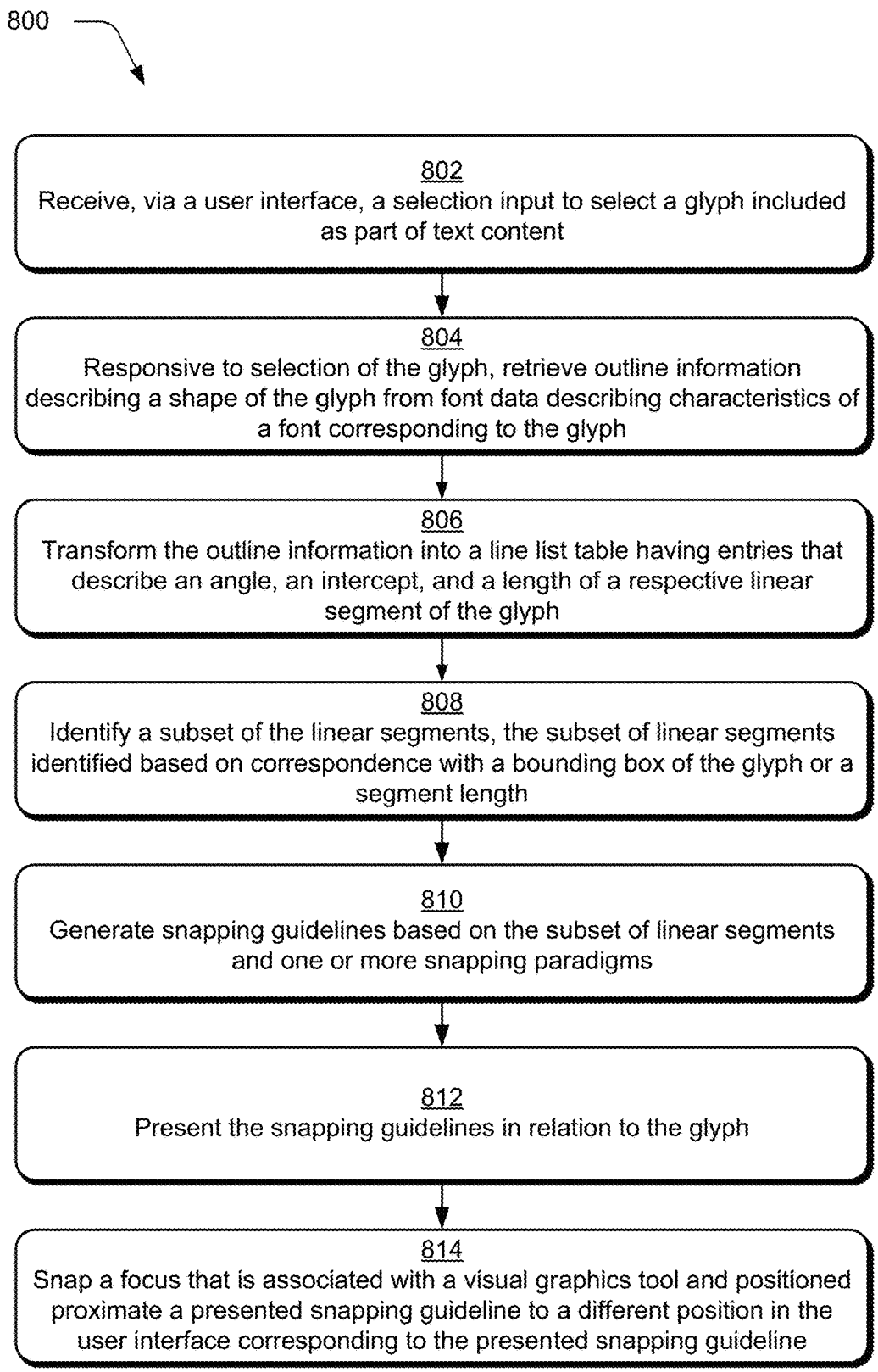
FIG. 8 depicts a procedure in an example implementation in which snapping guidelines are generated for a selected glyph without removing capability of the glyph to function as text.

FIG. 8 depicts an example procedure 800 in which snapping guides are generated for a selected glyph without removing capability of the glyph to function as text. A selection input is received via a user interface to select a glyph included as part of text content (block 802). By way of example, input is received by the computing device 102 to hover the cursor 308 proximate a glyph of the text content 306 for at least a threshold amount of time. Based on this, the glyph geometry module 116 receives the glyph selection data 204 which indicates the selected glyph, the one proximate to which the cursor 308 hovered. As noted above, glyphs may be selected for generating snapping guides in other ways without departing from the spirit or scope of the described techniques.

Responsive to the selection of the glyph, outline information describing a shape of the glyph is retrieved (block 804). In accordance with the principles discussed herein, the outline information is retrieved from font data describing characteristics of a font that corresponds to the selected glyph. By way of example, the glyph geometry module 116 obtains outline information describing a shape of the selected glyph. The glyph geometry module 116 may retrieve this information from a store of font data maintained by the computing device 102 or by remote storage across the network 110. In particular, the glyph geometry module 116 retrieves the outline information from font data that corresponds to a current font of the selected glyph.

The outline information is transformed into a line list table (block 806). In accordance with the principles discussed herein, the line list table includes entries that describe an angle, an intercept, and a length of a respective linear segment of the glyph. By way of example, the glyph outline module 116 transforms the information retrieved at block 804 into a line list table, which as discussed in more detail above is represented by the selected glyph outline 208.

A subset of the linear segments is identified (block 808). In accordance with the principles discussed herein, the linear segments of the subset are identified based on correspondence with a bounding box of the selected glyph or a segment length. By way of example, the snapping guide module 118 identifies a subset of the linear segments included in the line list table represented by the selected glyph outline 208. In particular, the snapping guide module 118 identifies the "important" linear segments. As discussed in more detail above, the snapping guide module 118 identifies linear segments as important based on one or more criteria, such as whether a linear segment corresponds to a bounding box of the selected glyph and whether a length of the linear segment meets or exceeds some length threshold.

Snapping guidelines are generated based on the subset of linear segments and one or more snapping paradigms (block 810). By way of example, one or more of the snapping paradigm modules 210 generates the snapping guides 218 based on the linear segments identified at block 808. The simple line snapping module 212, for instance, generates the snapping guides 218 for vertical and horizontal linear segments of the selected glyph. The equi-spacing snapping module 214 generates the snapping guides 218 substantially equidistant between determined pairs of vertical and pairs horizontal linear segments as discussed in more detail above. The angular snapping module 216 generates the snapping guides for non-vertical and non-horizontal linear segments.

The snapping guidelines are presented in relation to the glyph (block 812). By way of example, the user interface update module 220 causes a user interface of the content editing application 104 to present the vertical guidelines 506, 508 and the horizontal guidelines 510, 512, which correspond to determined snapping guides 218. In particular, the vertical guidelines 506, 508 and the horizontal guidelines 510, 512 correspond to the snapping guides generated by the simple line snapping module 212.

A focus that is associated with a visual graphics tool and positioned proximate a presented snapping guideline is snapped to a different position in the user interface (block 814). In accordance with the principles discussed herein, the different position corresponds to the proximate presented snapping guideline. By way of example, the content processing system 114 snaps the cursor 308—a focus of the content editing application 104's tools (e.g., a rectangle tool)—to the vertical guideline 506 when the content processing system 114 determines the cursor 308 is within a threshold position of the vertical guideline 506. This is represented in the illustrated example at the first time 502. Similarly, the content processing system 114 snaps the cursor 308 to the vertical guideline 508 at the second time 504, e.g., responsive to a determination that the cursor 308 is within a threshold position of the vertical guideline 508

Having described example procedures in accordance with one or more implementations, consider now an example system and device that can be utilized to implement the various techniques described herein.

Example System and Device

Figure 9:
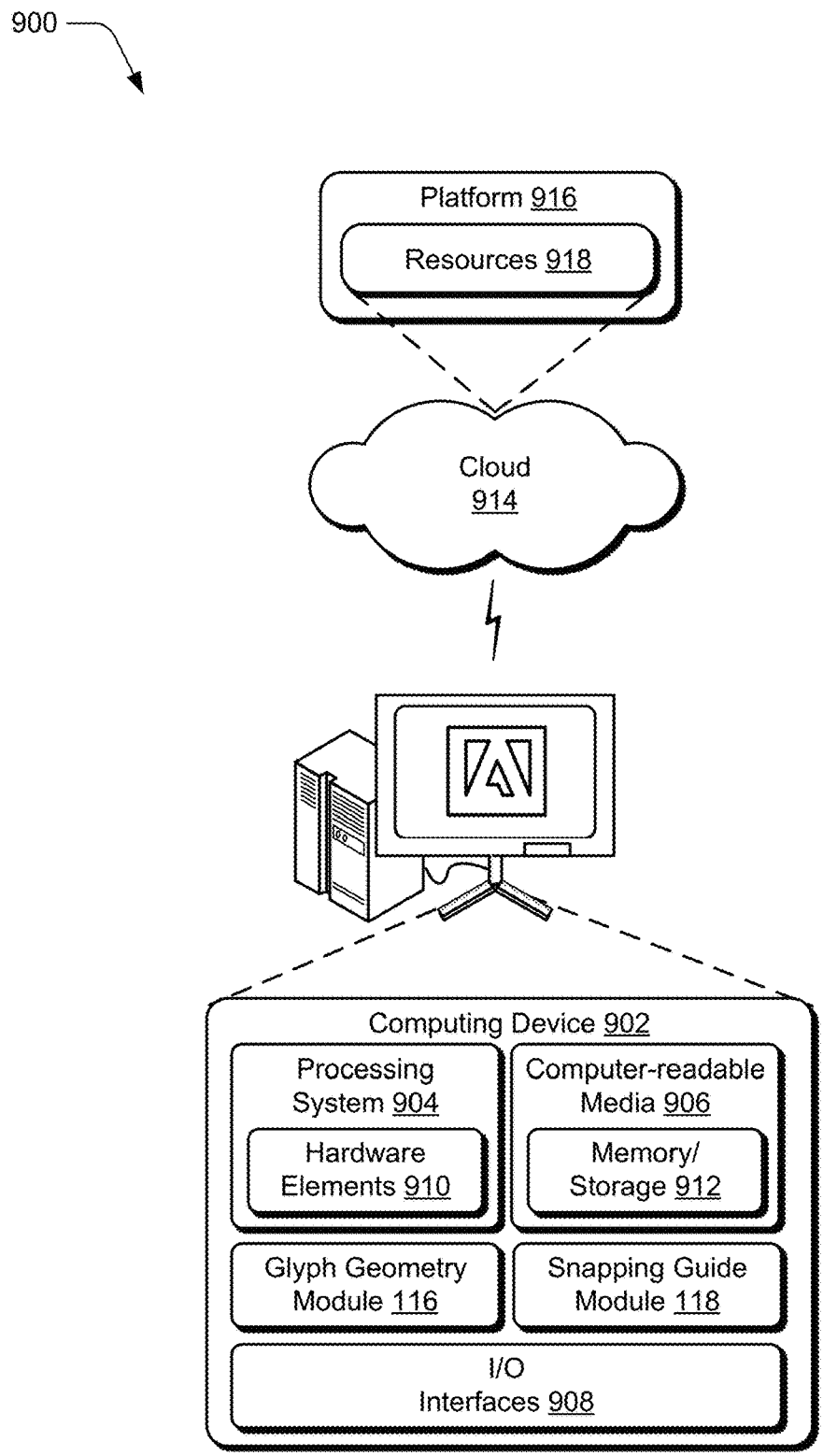
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the glyph geometry module 116 and the snapping guide module 118. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to aid graphical design in relation to text content included as part of digital visual content, a method implemented by at least one computing device, the method comprising:

receiving, by the at least one computing device, user input via a graphics editing tool for editing digital visual content that includes text content, the user input indicating an alignment of graphical content with a guideline presented in relation to a glyph included as part of the text content;

generating, by the at least one computing device, updated digital visual content by aligning the graphical content with the glyph via the guideline independent of converting the glyph to an outline; and presenting, by the at least one computing device and via a user interface, the updated digital visual content, each glyph of the text content as included in the updated visual content being editable using a text editing tool.

2. A method as described in claim 1, further comprising:

receiving a selection input selecting the glyph from the text content;

presenting at least a first snapping guideline in relation to the glyph;

snapping a focus of the graphics editing tool to a first position in the user interface that corresponds to the first snapping guideline, the snapping based on the user input positioning the focus proximate the first snapping guideline; and aligning the graphical content to the glyph based, in part, on the first position.

3. A method as described in claim 2, wherein the selection input comprises hovering the focus proximate the glyph.

4. A method as described in claim 2, wherein the selection input is received in relation to a user interface instrumentality indicative of an option to present snapping guides for the glyph.

5. A method as described in claim 2, further comprising:

presenting a second snapping guideline in relation to the glyph;

snapping the focus of the graphics editing tool to a second position in the user interface that corresponds to the second snapping guideline, the snapping to the second position based on the user input repositioning the focus proximate the second snapping guideline after the focus is snapped to the first position; and aligning the graphical content to the glyph further based on the second position.

6. A method as described in claim 1, further comprising receiving text editing input via the text editing tool to edit the text content as included in the updated digital visual content.

7. A method as described in claim 6, wherein the text editing input indicates to edit at least one of:

a font of the text content;

characters included in the text content, the text editing input indicating to add or remove one or more of the characters in relation to a caret; or a paragraph characteristic associated with the text content.

8. A method as described in claim 1, wherein generating the updated visual content comprises:

retrieving outline information for the glyph from a font data store, independent of converting the glyph to an outline; and transforming the outline information into a line list table that describes an angle, and intercept, and a length of each of a plurality of linear segments for the glyph.

9. A system comprising:

at least one processor; and a computer-readable storage medium having instructions stored thereon that are executable by the at least one processor to perform operations comprising:

receiving a selection of a glyph included in text content that comprises a plurality of glyphs;

generating information describing a subset of linear segments that combine to form a shape of the selected glyph;

generating snapping guidelines in relation to the selected glyph, the snapping guidelines enabling modification of the selected glyph by extending the shape of the selected glyph outside a bounding box of the selected glyph; and modifying the shape of the selected glyph, independent of converting the selected glyph to an outline, responsive to receiving input at one or more of the snapping guidelines, the plurality of glyphs remaining editable using a text editing tool after modifying the shape of the selected glyph.

10. A system as described in claim 9, the operations further comprising generating graphical content having an alignment that corresponds to at least one of the snapping guidelines, wherein modifying the selected glyph comprises adding the graphical content to the subset of linear segments.

11. A system as described in claim 9, the operations further comprising generating the snapping guidelines for horizontal and vertical linear segments of the subset.

12. A system as described in claim 9, the operations further comprising generating the snapping guidelines for non-horizontal and non-vertical linear segments of the subset.

13. A system as described in claim 9, the operations further comprising generating the snapping guidelines substantially equidistant between pairs of horizontal and pairs of vertical linear segments of the subset.

14. In a digital medium environment to aid graphical design in relation to text content included as part of digital visual content, a method implemented by at least one computing device, the method comprising:

receiving, by the at least one computing device and via a user interface, a selection input to select a glyph included as part of text content;

retrieving, by the at least one computing device, outline information describing a shape of the glyph from font data maintained for the text content;

transforming, by the at least one computing device, the outline information into a list of segment entries describing linear segments that form the shape of the glyph;

generating, by the at least one computing device, snapping guidelines based on the linear segments;

receiving, by the at least one computing device, input to one or more of the snapping guidelines that alters the shape of the glyph; and modifying the shape of the glyph in response to receiving the input, independent of converting the glyph to an outline, and preserving an ability to edit the modified shape of the glyph together with at least one other glyph of the text content using a text editing tool.

15. A method as described in claim 14, wherein the outline information describes the shape of the glyph using Bezier curves and the Bezier curves are transformed into the list of segment entries.

16. A method as described in claim 14, wherein a segment entry describes at least one of an angle, intercept, or length of a respective linear segment.

17. A method as described in claim 14, wherein the outline information specifies at least one of:

correspondence of a linear segment with a bounding box of the glyph; or a length of a linear segment.

18. A method as described in claim 14, wherein the retrieving the outline information describing the shape of the glyph is performed independent of converting the glyph to an outline.

19. A method as described in claim 14, further comprising receiving a request to change a font attribute of the text content and changing the font attribute of the glyph and the at least one other glyph responsive to receiving the request.

20. A method as described in claim 14, further comprising receiving text editing input via the text editing tool editing the text content including the modified shape of the glyph.

* * * * *